United States Patent
Hall (10) Patent No.: US 11,173,972 B2
(45) Date of Patent: Nov. 16, 2021

(54) CRAWLER BAR OF A CRAWLER TRACK

(71) Applicant: Hans Hall GmbH, Weingarten (DE)

(72) Inventor: Hans Hall, Weingarten (DE)

(73) Assignee: Hans Hall GmbH, Weingarten (DE)

(*) Notice: Subject to any disclaimer, the term of this patent is extended or adjusted under 35 U.S.C. 154(b) by 549 days.

(21) Appl. No.: 16/131,431

(22) Filed: Sep. 14, 2018

(65) Prior Publication Data
US 2019/0375471 A1 Dec. 12, 2019

(30) Foreign Application Priority Data
Jun. 11, 2018 (DE) .................. 20 2018 103 267.4

(51) Int. Cl.
*B62D 55/26* (2006.01)
*B62D 55/28* (2006.01)

(52) U.S. Cl.
CPC ............. *B62D 55/26* (2013.01); *B62D 55/28* (2013.01)

(58) Field of Classification Search
CPC ........ B62D 55/26; B62D 55/27; B62D 55/28; B62D 55/283
See application file for complete search history.

(56) References Cited

U.S. PATENT DOCUMENTS

| | | | | |
|---|---|---|---|---|
| 3,883,190 A * | 5/1975 | Kilbane, Jr. | ........... | B62D 55/24 305/180 |
| 5,265,949 A * | 11/1993 | Haug | .................... | B62D 55/27 305/180 |
| 8,388,072 B2 * | 3/2013 | Rainer | .................. | B62D 55/26 305/191 |
| 9,242,685 B2 * | 1/2016 | Pattyn | .................... | B62D 55/28 |
| 10,196,102 B2 * | 2/2019 | Pattyn | .................. | B62D 55/286 |
| 2008/0309157 A1 * | 12/2008 | Runggaldier | .......... | B62D 55/26 305/47 |
| 2015/0175225 A1 * | 6/2015 | Hall | ..................... | B62D 55/286 305/191 |

* cited by examiner

*Primary Examiner* — Jason R Bellinger
(74) *Attorney, Agent, or Firm* — Burr & Brown, PLLC (57) ABSTRACT

A crawler bar of a crawler track of a crawler vehicle is provided, including a linear bar base body and a cutting element. The cutting element contains a plurality of cutting element portions, each including a cutter-connecting member and a cutter. When installed, the crawler bar engages on a driving surface of the vehicle. The cutter-connecting member protrudes from and extends on the bar base body in a longitudinal extension of the bar base body. A main face of a first cutter-connecting member of a first cutting element portion lies in a plane (H1), a main face of a further cutter-connecting member of a further cutting element portion lies in a plane (H2), and the two planes (H1) and (H2) have a single intersection line (S) with each other.

21 Claims, 5 Drawing Sheets

CRAWLER BAR OF A CRAWLER TRACK

This application claims the benefit under 35 USC § 119(a)-(d) of German Application No. 20 2018 103 267.4 filed Jun. 11, 2018, the entirety of which is incorporated herein by reference.

FIELD OF THE INVENTION

The present invention relates to a crawler bar of a crawler track of a crawler vehicle, and a crawler track and/or a crawler vehicle with a crawler bar.

BACKGROUND OF THE INVENTION

Crawler bars are known in various designs.

A known crawler bar comprises a base body with a cutter which extends along the base body, wherein the cutter is divided into several cutter portions which are spaced apart from each other, viewed transversely to the crawler bar extension, so that the crawler bar is secure against tilting when resting on a substrate. The disadvantage with such a crawler bar is that, on use of the crawler bar on a muddy or slushy substrate, e.g. on snow, spaces between the base body and the cutter become clogged with mud, slush and/or snow, and the crawler bar thus loses the desired ground adhesion effect.

SUMMARY OF THE INVENTION

The object of the present invention is to provide an improved crawler bar which, for example, retains its ground adhesion during its use. In particular, the object of the present invention is to provide a crawler bar which is constructed in such a way that it does not become clogged with mud, slush or snow to the extent that it loses the desired ground adhesion effect.

The present invention lies in the fact that a crawler bar of a crawler track of a crawler vehicle, in particular, a snow-groomer vehicle, comprises a linear bar base body and a cutting element, wherein the cutting element contains several cutting element portions, wherein each cutting element portion comprises a cutter-connecting member and a cutter, wherein by means of the cutter, in the state arranged on the crawler vehicle, the crawler bar engages on a driving surface of the crawler vehicle, wherein the cutter-connecting member extends on the bar base body in a longitudinal extension of the bar base body, wherein the cutter-connecting member is arranged on the bar base body protruding from the bar base body, wherein the cutter-connecting member has a main face, wherein a main face of a first cutter-connecting member of a first cutting element portion lies in a plane, and a main face of a further cutter-connecting member of a further cutting element portion lies in a plane, and wherein the two planes have a single intersection line with each other. For example, a plane of a main face of a first cutter-connecting member of a first cutting element portion, and a plane of a main face of a further cutter-connecting member of a further cutting element portion have a single intersection line with each other. This gives a crawler bar on which, at particularly relevant points of the crawler bar, no substrate material e.g. snow or slush adheres during use, so that a desired ground adhesion effect of the crawler bar is retained.

Advantageously, the cutting element extends over at least one-third of a longitudinal extension of the bar base body. For example, in the state arranged on the crawler vehicle, the crawler bar engages by means of the cutter in a driving surface of the crawler vehicle. The driving surface of the crawler vehicle is advantageously a surface of a substrate on which the crawler vehicle may be moved, e.g. a ski piste. The driving surface consists e.g. of snow, ice and/or slush.

Preferably, the bar base body has a cavity along its longitudinal extension. For example, the bar base body is configured as a hollow profile. It is also conceivable that the bar base body is formed as an angled, bent and/or rolled element. Advantageously, the cavity is open when viewed in the longitudinal extension. Preferably, the cavity is formed closed or open when viewed transversely to the longitudinal extension, e.g. open in portions. It is conceivable that the cavity is open, in particular in portions, in the region of mounting and/or connection of the ice gripper elements.

The bar base body advantageously has a U-shaped cross-section, for example, when viewed in the longitudinal extension. For example, the U-shaped bar base body has a lower surface element by means of which the bar base body may be arranged on a crawler track or crawler chain, and two further surface elements which are spaced apart from each other and protrude e.g. vertically from the lower surface element. The further surface elements of the bar base body, for example, run parallel to each other. Advantageously, a cutter-connecting member of a cutting element portion is arranged at the open ends of the further surface elements which are opposite the lower surface element. The bar base body is, for example open, in particular continuously, between the open ends of the further surface elements.

The cutting element is, for example, divided over the length of the base body, wherein the cutting element portions, in particular the cutters of the cutting element portions, are e.g. arranged spaced apart when viewed transversely to the crawler bar longitudinal extension, or, for example, at least partially not overlapping with another cutting element portion or another cutter of another cutting element portion.

Advantageously, the crawler bar is configured—and in particular a cutting element portion is arranged on the bar base body in a longitudinal axis—such that in the state when the crawler bar is arranged on the crawler track and/or the crawler chain, the cutting element portion advantageously runs centrally over a drive wheel of the crawler track of the crawler vehicle.

Due to the above-mentioned advantageous embodiment of the crawler bar, a crawler bar is achieved which stands securely on a standing surface (the driving surface), i.e. does not tip over, since the bar can rest on the substrate, for example, on two cutting element portions which are arranged offset to each other. This has the advantage that, when parked, crawler tracks or crawler chains on which the crawler bar is mounted are not loaded by any tilt moment, or only by a comparatively slight tilt moment, and advantageously only vertical forces are transmitted from the crawler bar to the crawler tracks because the crawler bar does not tilt.

Preferably, a cutting element consists of at least two cutting element portions, for example, three cutting element portions, in particular precisely three cutting element portions, four cutting element portions or five cutting element portions.

Advantageously, over their height from the bar base body, the cutting element portions substantially have a same wall thickness. A cutting height of the cutting element portions preferably amounts to at least 20, 30, 40 or 50 mm. Depending on the substrate, the cutting height can be adapted to the resulting requirements.

For example, the main face of the first cutter-connecting member of the first cutting element portion, and the main face of the further cutter-connecting member of the further cutting element portion, are formed so as to run transversely to each other. For example, the planes of two main faces, e.g. of a first and a third cutting element portion, run, for example, on top of each other or are e.g. oriented at least approximately parallel to each other.

It has also proved advantageous for two main faces of two cutting element portions, in particular the planes of the two main faces of the two cutting element portions, to enclose between them an angle α which lies in a range between greater than 0° and less than 180°. Advantageously, the angle a lies in a range between 20° and 160°, e.g. between 30° and 150°, in particular between 45° and 135°. For example, the two main faces of the two cutting element portions, in particular the planes of the two main faces of the two cutting element portions, enclose between them an angle α of 10°, 20°, 30°, 40°, 45°, 50°, 60°, 70°, 80°, 90°, 100°, 110°, 120°, 130°, 135°, 140° or 150°.

Advantageously, the cutter-connecting member is angled, in particular, in the region of connection of the cutter-connecting member to the bar base body. For example, a main face of a cutting element portion, in particular a plane of the main face of the cutting element portion, encloses an angle β with a further surface element of the bar base body, in particular with an extension plane of an outside of the further surface element of the bar base body, wherein the angle β is greater than 0° and less than 90°, wherein the cutting element portion is advantageously connected to the further surface element of the bar base body. For example, the angle β lies in a range between 25° and 80°, between 30° and 65°, between 40° and 60°, between 40° and 50°, or between 50° and 60°. For example, the angle β amounts to 25°, 30°, 40°, 45°, 50°, 55°, 60° or 70°. Advantageously, all angles, in particular all angles β, of a plane of a main face of the cutting element portions, with an extension plane of an outside of the further surface elements, in particular to which the cutting element portions are each connected, are at least approximately equal.

Advantageously, the planes of the two main faces of two cutting element portions, with a plane of the lower surface element of the bar base body, viewed in a cross section of the crawler bar, form an at least approximately isosceles triangle.

Advantageously, the cutter comprises a cutter face, wherein the cutter extends on the bar base body in the longitudinal extension of the bar base body, in particular parallel to the longitudinal extension of the bar base body. For example, the cutter is formed serrated and/or corrugated. It is conceivable that the cutter-connecting member comprises the cutter. For example, the cutter-connecting member and the cutter are formed integrally.

An advantageous variant of the invention is a crawler bar of a crawler track of a crawler vehicle, wherein the crawler bar consists of a linear bar base body and a cutting element, wherein the cutting element is formed, for example, over at least one-third of a longitudinal extension of the bar base body, wherein the cutting element has several cutting element portions, wherein each cutting element portion comprises a cutter-connecting member and a cutter, wherein in the state arranged on the crawler vehicle, by means of the cutter, the crawler bar engages on a driving surface of the crawler vehicle, wherein the cutter-connecting member extends on the bar base body in a longitudinal extension of the bar base body, wherein the cutter-connecting member is arranged on the bar base body protruding from the bar base body, wherein the cutter-connecting member has a main face, and wherein, viewed in the longitudinal extension of the bar base body, a main face of a first cutting element portion and a main face of a further cutter-connecting member are interlaced.

In a particularly preferred embodiment of the present invention, the cutters of the cutting element portions, viewed in the bar direction, are spaced apart from each other transversely to the bar direction, in particular parallel. Advantageously, a distance between two cutters transversely to the longitudinal extension of the bar base body is at least ⅔ of a bar width of the bar base body. This means that in the longitudinal direction, one cutting element portion is followed by a further cutting element portion, wherein the cutters of the two cutting element portions are offset with respect to each other in a transverse direction. This gives an X shape when viewed in the crawler bar direction, in the longitudinal extension of the crawler bar, i.e. in the lateral projection of the bar element portions. Advantageously, the X shape is formed at least by regions of the cutting element portions.

In principle, the cutting element portions could also have different heights, preferably however not such a great height difference that an undesirable tilt would occur in the stance of the crawler bar in relation to crawler tracks.

It is furthermore proposed that ice gripper elements are present on the crawler bar, wherein at least two cutting element portions are spaced apart from each other by an ice gripper element.

Advantageously, the crawler bar comprises two or more ice gripper elements. Two ice gripper elements are, for example, spaced apart by a cutting element portion, in particular, by a length of the cutting element portion.

It is also proposed that an ice gripper element is arranged on the crawler bar, running transversely to a main face of a cutter-connecting member. Advantageously, an ice gripper element, in particular all ice gripper elements, run transversely to each of the main faces of the cutter-connecting members of the crawler bar. Two cutting element portions are, for example, spaced apart from each other by an ice gripper element, in particular, for example, by precisely a width of the ice gripper element.

Preferably, an ice gripper element, in particular, a flat side of the ice gripper element, is oriented transversely to a flat side of a further ice gripper element. For example, an ice gripper element is connected by its flat side to a cutter-connecting member and/or a cutter of a cutting element portion. For example, an ice gripper element is connected with a first flat side to a first cutter-connecting member and/or a first cutter of a first cutting element portion, and with a second flat side to a second cutter-connecting member and/or a second cutter of a further cutting element portion. Advantageously, the first and second flat sides of the ice gripping element lie opposite each other and are spaced apart by a width of the ice gripper element. The ice gripper element is, for example, plate-like with a first and a second flat side.

It has also proved advantageous if an ice gripper element is connected, in particular, unreleasably, to the bar base body, to a cutting element portion and/or to a cutter.

For example, an ice gripper element, in particular, all ice gripper elements, is/are welded, bolted and/or clamped to the bar base body, to a cutting element portion and/or to a cutter. Advantageously, an ice gripper element is connected, in particular, to precisely one cutting element portion, in particular, precisely two cutting element portions and/or precisely two cutters. For example, an ice gripper element is connected precisely to the first cutting element portion and a further cutting element portion.

It has also proved advantageous if an ice gripper element protrudes above a cutter face of a cutter of a cutting element portion. A protruding end of the ice gripper element is e.g. formed so as to be pointed. For example, the ice gripper element comprises an ice spike. This gives an improved surface adhesion, in particular, on a comparatively hard substrate surface, e.g. on an ice surface.

It is also advantageous if a cut-out is formed on the ice gripper element, wherein in the state arranged on the crawler bar, the cut-out at least in portions follows a course, in particular, a course in an extension direction, of a main side of a cutter-connecting member of a cutting element portion. Advantageously, the cut-out is made in a region of the flat side of the ice gripper element. For example, the ice gripper element comprises two cut-outs. This prevents an accumulation of deposits, e.g. slush or snow, at an interface of the ice gripper element/cutting element portion, between the flat side of the ice gripper element and the main side of the cutter-connecting member, in particular, such that a desired surface adhesion effect is retained despite e.g. slight deposits at the interface.

Advantageously, the cut-out is adapted to a course of a main side of the cutter-connecting member of a cutting element portion. Advantageously, the cut-out, in particular, an edge of the cut-out, in the arranged state of the ice gripper element and cutting element portion, is offset or spaced from the main side of the cutting element portion. This facilitates connection of the ice gripper element to the cutting element portion, since in this way e.g. space is created for a weld seam.

It is also conceivable that in the arranged state, the main side of the cutter-connecting member terminates, at least in portions, flush or approximately flush with the cut-out in the flat side, in particular an edge of the cut-out of the flat side of the ice gripper element. Advantageously, a first portion e.g. the edge of the cut-out of the flat side follows a course of a main side of a first cutter-connecting member, and a second portion e.g. edge of the cut-out of the flat side follows a course of a main side of a second cutter-connecting member.

The cut-out is, for example, formed triangular or L-shaped. Advantageously, the cut-out comprises three side portions, wherein a first side portion of the cut-out of the first portion, a second side portion of the cut-out of the second portion, and a third side portion of the cut-out are configured so as to be open.

It is also proposed that the cutter and the cutter-connecting member of a cutting element portion are angled relative to each other. In this way, a cutter height of the cutter can be predefined in a comparatively simple fashion. In particular, this ensures that the crawler bar with the cutter faces of the cutters of the cutting element portions comes to stand on a driving surface comparatively parallel to the driving surface, so that advantageously, a tilt moment on the crawler track on which the crawler bar may be arranged is reduced.

It is also advantageous if the bar base body and the cutting element are formed integrally. This advantageously reduces the production costs of the crawler bar. For example, the bar base body and the cutting element are provided as a bent part and/or a rolled part. It is also conceivable that the bar base body and the cutting element are connected together in particular unreleasably. For example, the bar base body and the cutting element are welded, bolted and/or riveted together.

It is also advantageous if the bar base body and a cutting element portion are formed integrally. For example, the bar base body and the cutting element portion are provided as a bent part. It is also conceivable that the bar base body and the cutting element portion are connected together, in particular, unreleasably. For example, the bar base body and the cutting element portion are welded, bolted and/or riveted together.

The respective crawler bars are preferably made completely of steel; however, other materials such as aluminum or fiber composite materials are also conceivable, or material combinations such as e.g. aluminum/steel. The crawler bar, in particular consisting of the bar base body and the cutting element, is, for example, formed as one piece.

An advantageous modification of the present invention is a crawler track of a crawler vehicle with a crawler bar according to one of the crawler bar variants described above.

The crawler chain advantageously comprises a crawler track on which the crawler bar may be arranged. For example, the crawler bar is connected releasably or unreleasably to the crawler track. Preferably, a plurality of crawler bars is arranged offset, in particular alternately, e.g. alternating in the running direction, on a complete crawler chain.

An advantageous embodiment of the present invention is also a crawler vehicle, in particular a snow-groomer vehicle, with a crawler track according to one of the above-mentioned crawler track variants, and/or a crawler bar according to one of the above-mentioned embodiments.

BRIEF DESCRIPTION OF THE DRAWINGS

Several exemplary embodiments are described in more detail below with reference to the attached drawings, indicating further details and advantages.

DETAILED DESCRIPTION OF THE DRAWINGS

Figure 1:
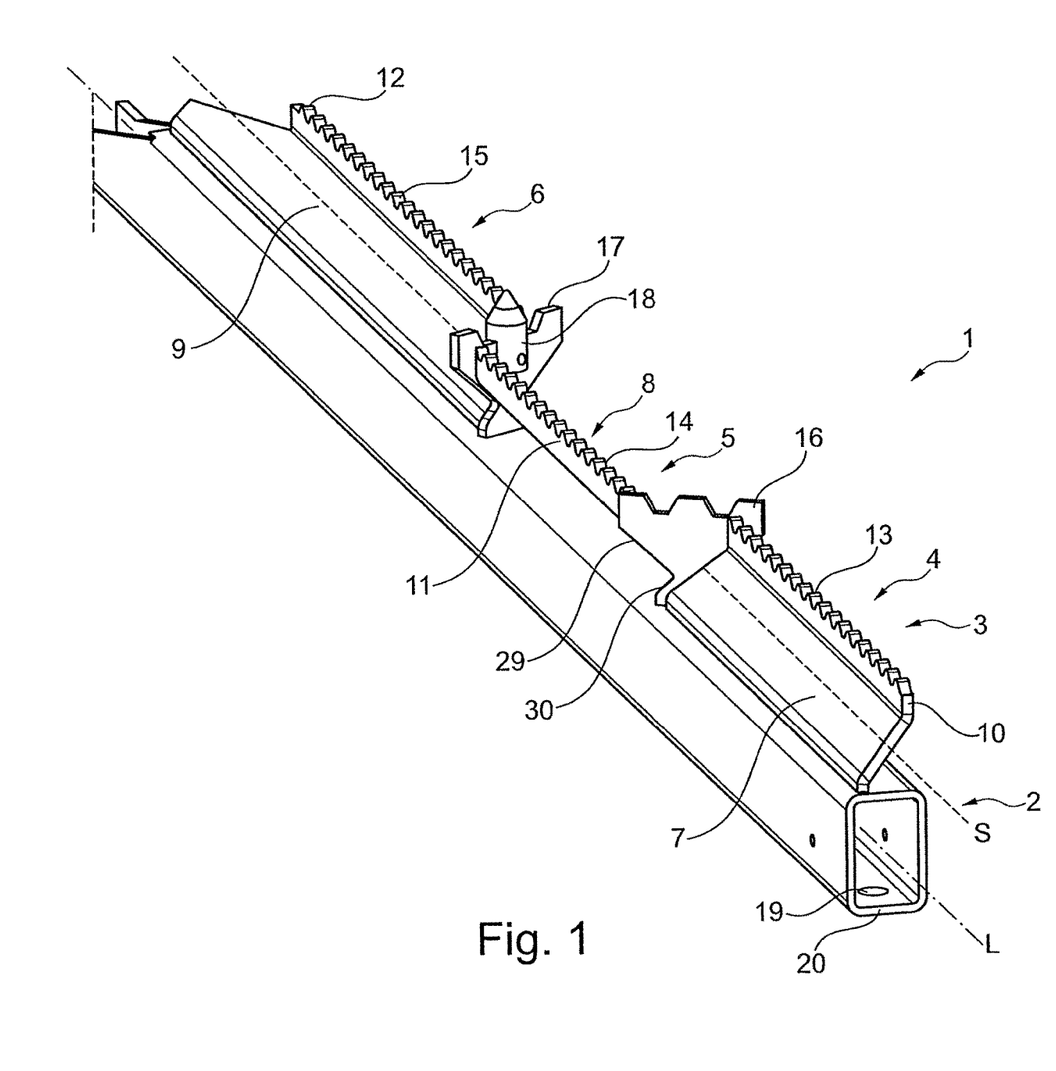
FIG. 1 is a perspective view, obliquely from the side at the top front, of a first embodiment of a crawler bar according to the present invention.

FIG. 1 shows a crawler bar 1 according to the present invention, consisting of a bar base body 2 and a cutting element 3. The cutting element 3 consists, for example, of three cutting element portions 4 to 6, wherein each cutting element portion 4 to 6 comprises a respective cutter-connecting member 7 to 9 and a cutter 10 to 12.

Each cutter 10 to 12 furthermore comprises a cutter face 13 to 15 with which the crawler bar 1, in the state arranged on a crawler chain or crawler track of a crawler vehicle, engages on a driving surface of the crawler vehicle, e.g. stands on the driving surface or digs into the driving surface. The cutters 10 to 12 are advantageously formed as toothed rods.

The cutting element portions 4 to 6 extend on the bar base body 2, advantageously along a longitudinal axis L of the bar base body 2.

Also advantageously, an ice gripper element 16, 17 is arranged on the crawler bar 1. The ice gripper element 16 connects the two cutting element portions 4 and 5, and the ice gripper element 17 connects the two cutting element portions 5 and 6 together. The ice gripper elements 16, 17 are e.g. plate-like. Furthermore, an ice spike 18 may be arranged on the ice gripper elements 16, 17. The ice spike 18 is, for example, bolted to the ice gripper element 17. The ice gripper elements 16, 17 advantageously extend on the bar base body 2 obliquely and/or transversely to the longitudinal extension L of the bar base body 2.

Mounting elements e.g. in the form of a through-bore 19 are arranged on the bar base body 2, in order to connect the crawler bar 1 to a crawler chain and/or a crawler track. The mounting elements are advantageously present on a lower surface element 20 of the bar base body 2.

Figure 3:
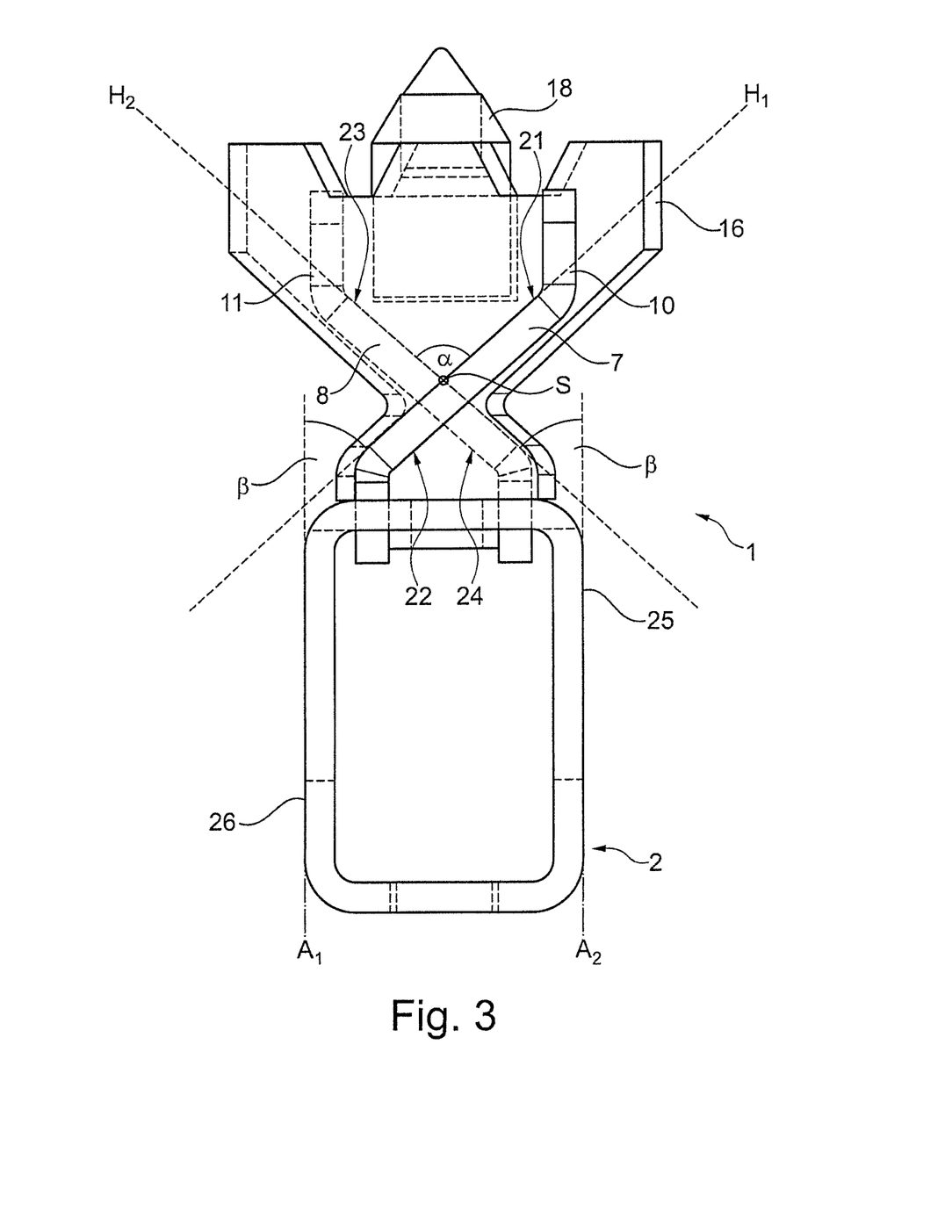
FIG. 3 is a front view of the crawler bar according to FIG. 2, wherein parts, in particular, an ice gripper element of the crawler bar, are depicted at least partially transparently.

Advantageously, a first cutter-connecting member 7 comprises a first main side 21 and a second main side 22, wherein the two main sides 21, 22 lie opposite each other and are spaced apart from each other by a width of the cutter-connecting member 7. A further cutter-connecting member 8 advantageously also comprises a first main side 23 and a second main side 24. The first main side 21 of the first cutter-connecting member 7 advantageously extends in a plane H1, and the first main side 23 of the further cutter-connecting member 8 extends, for example, in a plane H2. The two planes H1 and H2 stand relative to each other such that they intersect at a single intersection line S (FIG. 3). The two planes H1 and H2 here enclose an angle α.

A plane H1, H2 of the first main side 21, 23 of the cutter-connecting member 7 advantageously encloses an angle β with a plane A1 of a flat side 25 or a plane A2 of a flat side 26.

Figure 2:
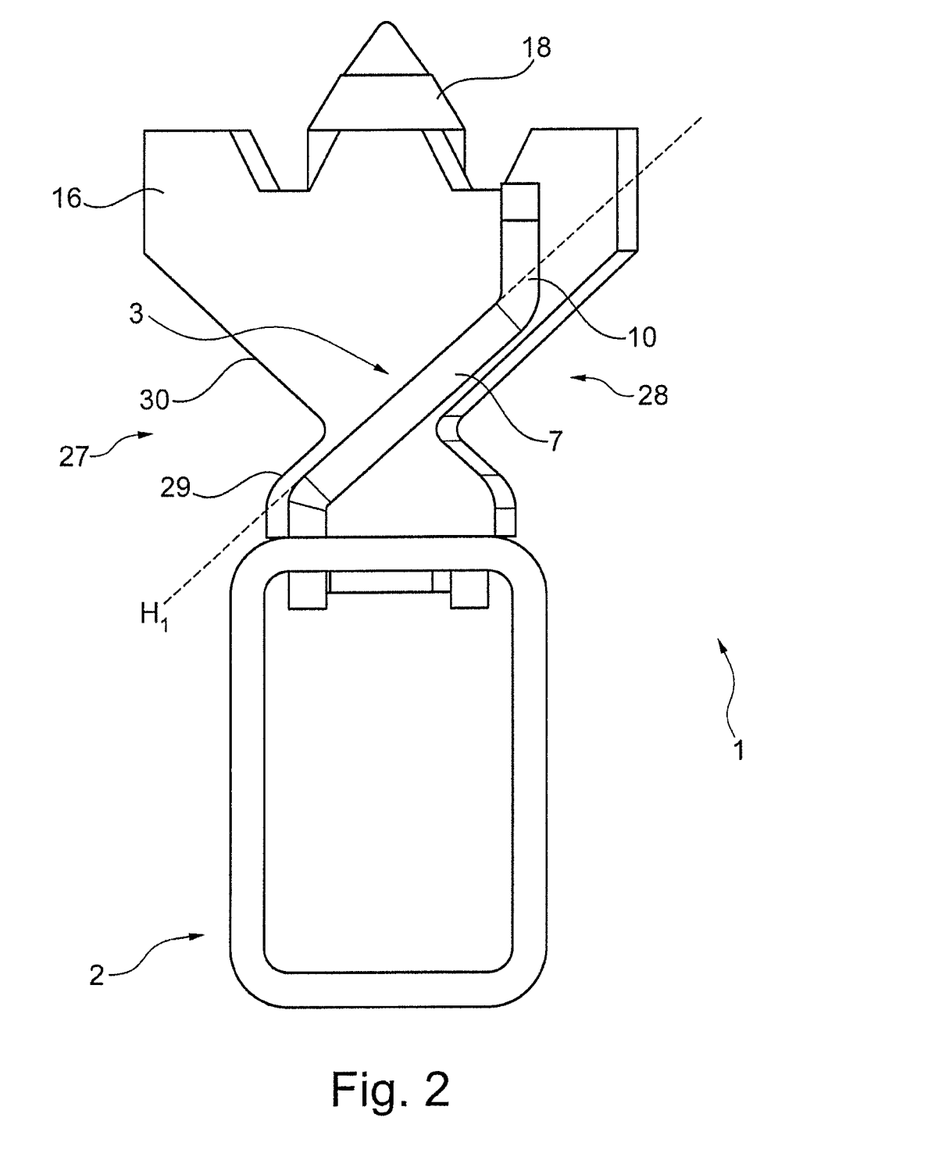
FIG. 2 is a front view of the crawler bar according to FIG. 1.

The ice gripper element 16 comprises, for example, two cut-outs 27, 28. A cut-out 27 comprises for example two edge portions 29, 30. Advantageously, an edge portion 30 runs at least approximately parallel to the plane H1 of the first main side 21 of the first cutter-connecting member 7, and/or the edge portion 30 runs at least approximately parallel to the plane H2 of the first main side 23 of the first cutter-connecting member 8 (FIG. 2).

Figure 4:
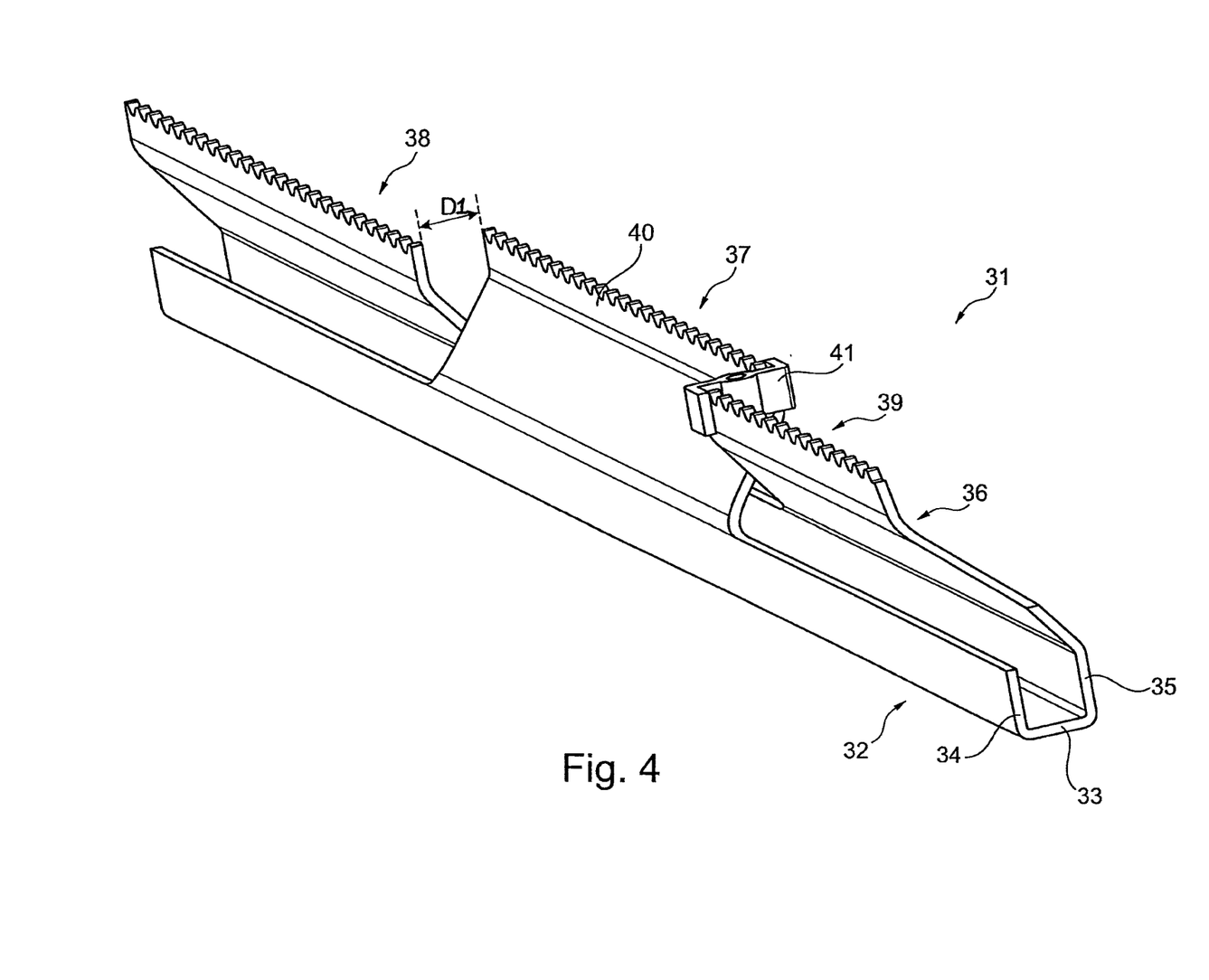
FIG. 4 is a perspective view, obliquely from the side at the top front, of a further embodiment of a crawler bar.
Figure 5:
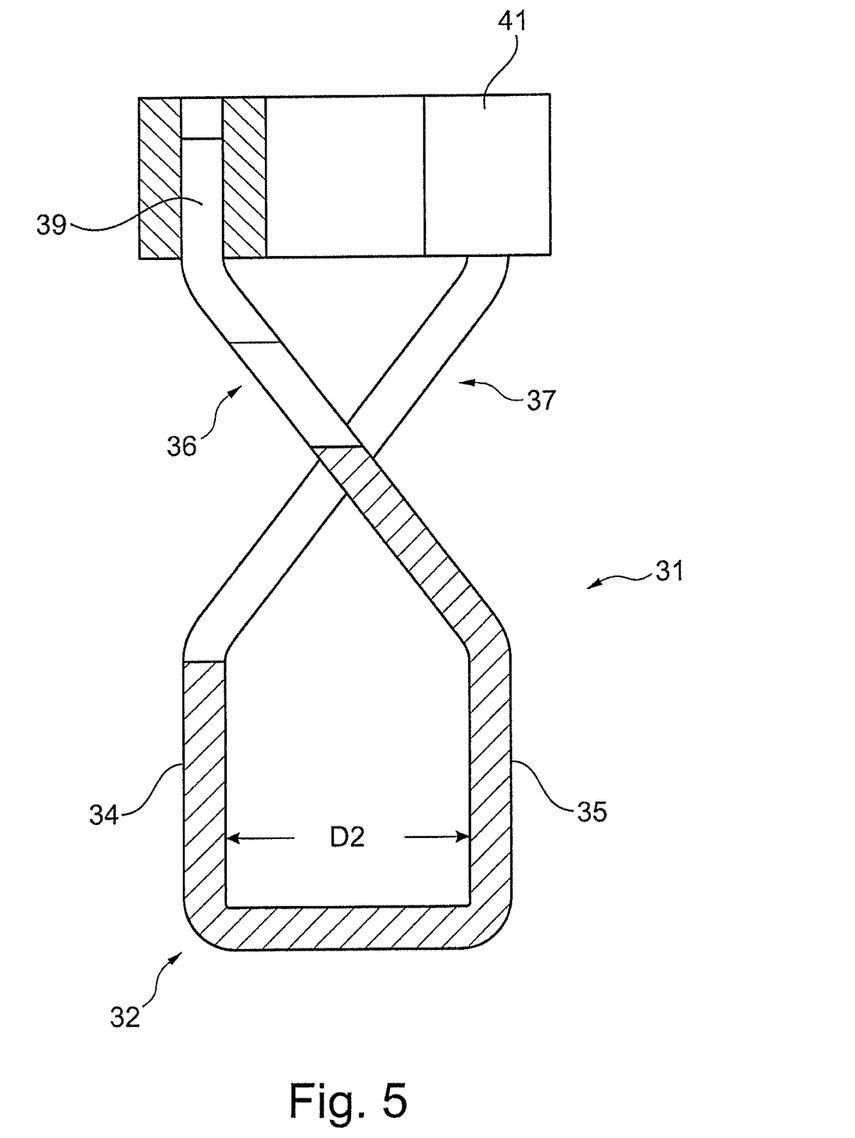
FIG. 5 is a front view of the crawler bar according to FIG. 4.

FIGS. 4 and 5 show a further embodiment of a crawler bar 31. The crawler bar 31 is advantageously formed as one piece. The crawler bar 31 is, for example, bent from one piece of metal. A bar base body 32 of the crawler bar 31 comprises a lower surface element 33 and two further surface elements 34, 35. The further surface elements 34, 35 are bent up from the lower surface element 33, for example, protruding from the lower surface element 33.

Then at a top end of the further surface elements 34, 35, cutting element portions 36 to 38 are arranged on the further surface elements 34, 35. Cutters 39, 40 of the cutting element portions 36, 37 are advantageously connected by means of a further embodiment variant of an ice gripper element 41.

The ice gripper element 41 is, for example, bolted to the cutters 39, 40. This, comparatively, increases a stability of the cutting element portions 36, 37. The cutters 39, 40 are advantageously separated from each other approximately by a distance D1. The distance D1 between the cutters 39, 40 advantageously corresponds approximately to a distance D2 between the further surface elements 34, 35 of the bar base body 32.

LIST OF REFERENCE SIGNS

1 Crawler bar
2 Bar base body
3 Cutting element
4 Cutting element portion
5 Cutting element portion
6 Cutting element portion
7 Cutter-connecting member
8 Cutter-connecting member
9 Cutter-connecting member
10 Cutter
11 Cutter
12 Cutter
13 Cutter face
14 Cutter face
15 Cutter face
16 Ice gripper element
17 Ice gripper element
18 Ice spike
19 Through-bore
20 Surface element
21 Main side
22 Main side
23 Main side
24 Main side
25 Surface side
26 Surface side
27 Cut-out
28 Cut-out
29 Edge portion
30 Edge portion
31 Crawler bar
32 Bar base body
33 Surface element
34 Surface element
35 Surface element
36 Cutting element portion
37 Cutting element portion
38 Cutting element portion
39 Cutter
40 Cutter
41 Ice gripper element

The invention claimed is:

1. A crawler bar of a crawler track of a crawler vehicle, the crawler bar comprising:
   a linear bar base body; and
   a cutting element;
   wherein the cutting element contains a plurality of cutting element portions,
   wherein each of the plurality of cutting element portions comprises a cutter-connecting member and a cutter,
   wherein when installed, the crawler bar engages on a driving surface of the vehicle,
   wherein a first cutter-connecting member of a first cutting element portion extends on the bar base body in a longitudinal extension of the bar base body,
   wherein the first cutter-connecting member is arranged on the bar base body protruding from the bar base body,
   wherein a main face of the first cutter-connecting member of the first cutting element portion lies in a first plane (H1), and a main face of a further cutter-connecting member of a further cutting element portion lies in a second plane (H2), and
   wherein the first and second planes (H1) and (H2) have a single intersection line (S) with each other.

2. A crawler bar of a crawler track of a crawler vehicle, comprising:
   a linear bar base body; and
   a cutting element;

wherein the cutting element has a plurality of cutting element portions, wherein each of the plurality of cutting element portions comprises a cutter-connecting member and a cutter, wherein when installed, the crawler bar engages on a driving surface of the vehicle, wherein a first cutter-connecting member extends on the bar base body in a longitudinal extension of the bar base body, wherein the first cutter-connecting member is arranged on the bar base body protruding from the bar base body, wherein the first cutter-connecting member has a main face, and wherein, when viewed in the longitudinal extension of the bar base body, the main face of the first cutter-connecting member and a main face of a further cutter-connecting member are interlaced.

3. The crawler bar as claimed in claim 1, wherein ice gripper elements are arranged on the crawler bar, wherein at least two cutting element portions are spaced apart from each other by an ice gripper element.

4. The crawler bar as claimed in claim 3, wherein one of the ice gripper elements is arranged on the crawler bar running transversely to a main face of one of the cutter-connecting members.

5. The crawler bar as claimed in claim 3, wherein the ice gripper element is connected to the bar base body and/or one of the plurality of cutting element portions.

6. The crawler bar as claimed in claim 3, wherein the ice gripper element protrudes above a cutter face of a cutter of one of the plurality of cutting element portions.

7. The crawler bar as claimed in claim 3, wherein a cut-out is formed on the ice gripper element, and wherein when installed, at least portions of the cut-out follow a course of a main side of one of the cutter-connecting members of one of the plurality of cutting element portions.

8. The crawler bar as claimed in claim 1, wherein the cutter and the cutter-connecting member of one of the plurality of cutting element portions are angled relative to each other.

9. The crawler bar as claimed in claim 1, wherein the bar base body and the cutting element are formed integrally.

10. The crawler bar as claimed in claim 1, wherein the bar base body is formed integrally with respect to one of the plurality of cutting element portions.

11. A crawler track of a crawler vehicle having the crawler bar as claimed in claim 1.

12. A crawler vehicle having the crawler track as claimed in claim 11.

13. The crawler bar as claimed in claim 1, wherein the crawler bar consists of the linear bar base body and the cutting element, and wherein, when viewed in the longitudinal extension of the bar base body, the main face of the first cutter-connecting member and a main face of a further cutter-connecting member are interlaced.

14. The crawler bar as claimed claim 2, wherein ice gripper elements are arranged on the crawler bar, and wherein at least two of the plurality of the cutting element portions are spaced apart from each other by an ice gripper element.

15. The crawler bar as claimed in claim 14, wherein on of the ice gripper elements is arranged on the crawler bar running transversely to a main face of one of the cutter-connecting members.

16. The crawler bar as claimed in claim 14, wherein on of the ice gripper elements is connected to the bar base body and/or to one of the plurality of cutting element portions.

17. The crawler bar as claimed in claim 14, wherein one of the ice gripper elements protrudes above a cutter face of a cutter of one of the plurality of cutting element portions.

18. The crawler bar as claimed in claim 14, wherein a cut-out is formed on the ice gripper element, and wherein, when installed, at least portions of the cut-out follow a course of a main side of one of the cutter-connecting members of one of the plurality of cutting element portions.

19. The crawler bar as claimed in claim 2, wherein the cutter and the cutter-connecting member of one of the plurality of cutting element portions are angled relative to each other.

20. The crawler bar as claimed in claim 2, wherein the bar base body and the cutting element are formed integrally.

21. The crawler bar as claimed in claim 2, wherein the bar base body is formed integrally with respect to one of the plurality of cutting element portions are formed integrally.

* * * * *